United States Patent [19]
O'Connell et al.

[11] Patent Number: 5,453,983
[45] Date of Patent: Sep. 26, 1995

[54] PORT CONTROLLER

[75] Inventors: Anne O'Connell; John Hickey; Tadhg Creedon, all of Galway, Ireland

[73] Assignee: Digital Equipment Corp., Patent Law Group, Maynard, Mass.

[21] Appl. No.: 130,609

[22] Filed: Oct. 1, 1993

[30] Foreign Application Priority Data

Oct. 21, 1992 [IE] Ireland ..................................... 922761

[51] Int. Cl.[6] ........................ G06F 13/18; G06F 13/376; H04J 3/17
[52] U.S. Cl. ...................... 370/85.6; 340/825.5; 370/95.1
[58] Field of Search ............................... 370/85.6, 85.11, 370/85.9, 112, 95.1, 95.2, 95.3, 85.7; 340/825.5, 825.51; 307/239, 243; 328/104, 103, 152, 154

[56] References Cited

U.S. PATENT DOCUMENTS

| | | | |
|---|---|---|---|
| 4,189,766 | 2/1980 | Horiguchi et al. | 340/825.5 |
| 4,669,079 | 5/1987 | Blum | 370/85.6 |
| 4,716,525 | 12/1987 | Gilanyi et al. | 364/200 |
| 4,779,089 | 10/1988 | Theus | 340/825.5 |
| 4,894,565 | 1/1990 | Marquardt | 340/825.5 |
| 4,962,379 | 10/1990 | Yasuda et al. | 340/825.5 |
| 5,008,880 | 4/1991 | Azuma | 370/85.6 |
| 5,128,937 | 7/1992 | Khalil | 370/85.6 |
| 5,268,902 | 12/1993 | Onozaki | 370/85.6 |

*Primary Examiner*—Wellington Chin
*Attorney, Agent, or Firm*—A. Sidney Johnston; Christine M. Kuta

[57] ABSTRACT

Two devices HR and FR are coupled to a bus with a common memory via a port controller. Device HR requires a high (or maximum) average rate of access, device FR requires a fast response (minimum latency) in establishing access. Request signals HRQ, FRQ from the devices are latched by latches 20 and 21, passed as HRX, FRX through an arbitration or resolver circuit 22 as HRY, FRY to a sequence control unit 23 to initiate an access cycle. Cycle timing is determined by a delay line timebase circuit 24, which responds to a single change of level of a signal DLY (in either direction). Latch 21, when set, generates an request pending signal FRRP which is fed to the HR device to cause it to increase its cycle length so that the FR access cycle will finish before the next HR access cycle is initiated.

11 Claims, 3 Drawing Sheets

PORT CONTROLLER

The present invention relates to digital communication systems, and more specifically to port controllers for selecting between ports of different characteristics for connection to a bus.

In virtually all situations where a plurality of devices are connected to a common further device such as a bus, some means is required for controlling access to the bus to avoid conflicts between the different devices and to optimize the accesses in the light of the different requirements of the different devices.

One specific requirement to couple two ports to a common bus (e.g. a memory), with one port (a fast response, FR, port) requiring a guaranteed maximum latency, ie guaranteed access to the bus within a fixed time period, and the other port (a high rate, HR, port) requiring a high average bandwidth, ie. a high average data rate over the bus. (The term 'fast response' does not necessarily imply that the device which we are calling the fast response device is itself fast; although it requires fast access to the bus, it may require a relatively long time to complete its access through the bus.) The bus may for example provide access to a memory shared by the two devices.

One technique for achieving this is to couple each device directly to the bus, and to provide a bus access control unit coupled to the two devices. Each time a device wants to access the bus it sends a request to the bus access control unit. This unit performs an arbitration function, resolving conflicts between the two devices and allowing one or other device to access the bus.

One drawback to this technique is that the bus access timings are determined by the devices themselves. If one device (in our case, the fast access device) has a long cycle time, the bus will be inaccessible to the other device (in our case, the high rate device) for the whole of the cycle time of the fast access device. This technique also requires the devices to be capable of "hand-shaking" with the bus access control unit, and the operation of the bus access control unit involves a certain amount of delay.

These problems can be overcome to some extent by providing buffering between the devices and the memory bus. However, this increases the amount of hardware required. Also, although buffering may increase the effective throughput, it necessarily increases the access time to the memory.

Another technique for coupling two devices to a common memory is to use a synchronous system. In this, a bus access control unit is synchronized with one of the devices—preferably the faster device (in our case, the high rate device). However, this also has various disadvantages. There must be reserved periods during which the bus is unused, to guarantee periods in which the high rate device is not using the device and the fast access device can gain access to the bus. Also, the need to resolve possible synchronization uncertainties between competing requests from the two devices will result in further inefficiencies.

Also, with this synchronization technique, the timing of the memory bus is sychronized with the high rate device. This gives rise to a further disadvantage if, as may often be the case, the clock period of the high rate device is variable—that is, the clock rate of the high rate device may be different between different installations of the same system. If this device runs below the maximum designed speed, the memory accesses will be correspondingly slowed, and the potential delays to the fast access device accessing the bus will be correspondingly increased.

This drawback can be overcome to some extent by making the bus access control unit clocking that of the fastest possible rate for the high rate device, independent of the actual operating rate of that device. This reduces the amount of lost time if the high rate device actually has a slow clock. However, it has its own inefficiencies, because both devices are now unsynchronized with the bus access control unit, and there will be a delay between the actual instant when a device requests access to the bus and the bus access control unit starts a new cycle and recognizes that request. (The bus access control unit also, of course, has to arbitrate if it receives competing requests). This inefficiency can be reduced by increasing the clock rate of the bus access control unit, but it may then require more than one cycle to respond to an access request and determine whether there is a potential conflict and, if there is, resolve it.

The general object of the present invention is to provide an improved bus access control technique in the above situation; that is, to provide an improved solution to the problem of providing an efficient port controller for coupling a fast response port and a high rate port to a common bus.

According to its broadest aspect the present invention provides a controller for coupling a plurality of devices to a common bus, the bus and each device having a data channel, an address channel, and a control channel, the controller comprising a data and address multiplexer for multiplexing the data and address channels of the devices onto the bus data and address channels and a control unit responsive to the control channels to control the multiplexer, wherein the control unit comprises:

resolver means responsive to an access request from any of the devices, to pass on that request and to resolve competing access requests from different devices by passing on only one such request; and asynchronous sequence control means fed from the resolver means and coupled to an asynchronous timebase generator, both the sequence control means and the timebase generator being normally in an idle state, the sequence control means being responsive to an access request passed on by the resolver means to initiate operation of the timebase generator and, in response to timing signals from the timebase generator, cycling through a series of states which control the multiplexer and provide timing signals to the bus.

Preferably the resolver means includes a plurality of latches one for each device for latching access requests from the devices. Preferably also at least one of the latches, on being set, sends a request pending signal to at least one other device to cause that device to extend its operating cycle and thereby ensure that any access request will be dealt with correctly.

The latch sending the request pending signal may include a portion responsive to an early warning signal from its associated device, with the device associated with the latch sending the request pending signal requiring a minimum latency time (wait time) for access to the bus and the device receiving that signal requiring a high average access rate to the bus.

Preferably the timebase generator comprises a delay line.

Preferably also the operation of the timebase generator is initiated by a change of signal level in either direction, and the sequence control means is responsive to timing signals each consisting of a change of level in either direction.

A port controller embodying the invention will now be described, by way of example, with reference to the drawings, in which.

Figure 1:
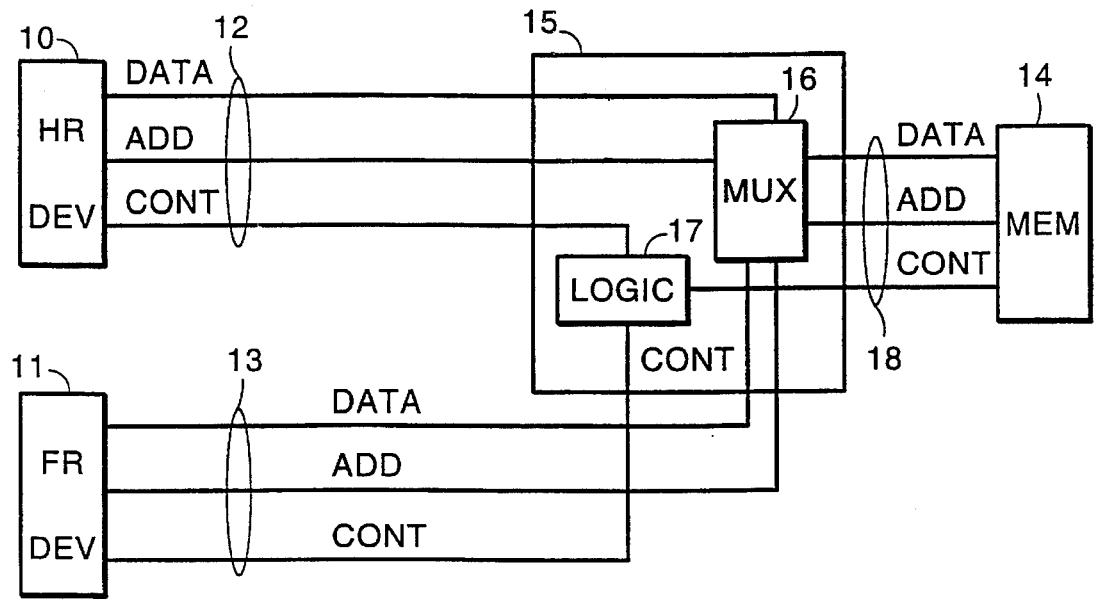
FIG. 1 is a general block diagram of the port controller, the two ports, and the bus.

Referring to FIG. 1, the system comprises a high rate device HR DEV 10 and a fast response device FR DEV 11. These two devices are coupled via respective buses 12 and 13 through a port controller 15 and a bus 18 to a memory 14. Each of the devices 10, 11, and 14 is coupled to the port controller by means of a data channel DATA, an address channel ADD, and a control channel Cont. In the specific system, the HR device is a synchronous device with a normal cycle time between 160 and 320 ns (depending on its clock speed), and the FR device is an asynchronous device with a cycle time normally between 1.9 and 2.5 μs. The access time for an access to the memory 14 is approximately 80 ns, and in principle the devices 10 and 11 can achieve a read or write in the memory access time.

The data and address channels from the two devices 10 and 11 are connected to one side of a multiplexer 16 in the controller 15 and the data and address channels from the memory 14 are connected to the other side of this multiplexer. All three control channels are connected to control logic 17, also in the controller 15, which produces a select signal which drives the multiplexer to couple the data and address channels of the bus 18 with those of the selected device and control signals (including timing signals) for the memory 14.

Each of the control channels from the two devices 10 and 11 to the port controller 15 includes two signals, a request signal (HRQ and FRQ) and a read/write signal (HRR/W and FRR/W). For each device, the request signal goes to 1 (true, asserted) when the device wants to access the bus, and the read/write signal indicates whether the device wants to read or write data. The read/write signals are fed to the multiplexer 16, and that of the selected device determines the direction in which the data and address signals pass through the multiplexer. In addition, the FR device 11 generates an early warning signal ASL shortly before the request signal FRQ, and the port control logic 17 generates a request pending signal FRRP signal which is fed to the HR device 10.

Figure 2:
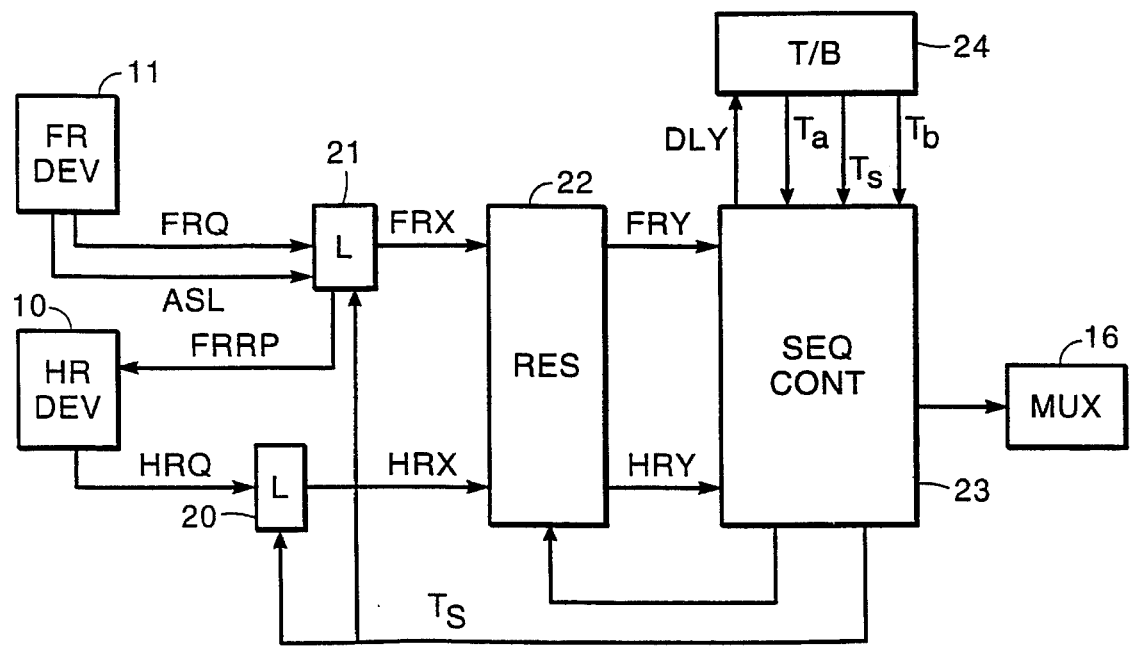
FIG. 2 is a more detailed block diagram of the control logic of the port controller.

FIG. 2 shows the circuitry of the control logic 17. The two request signals HRQ and FRQ are fed to respective latch circuits HRL 20 and FRL 21. Circuit 20 produces a signal HRX in response to the request signal HRQ; when HRQ goes to 1, HRX goes to 1 and remains at 1 until an HR port access cycle has been started, returning to 0 shortly before the end of the access cycle. Signal HRX can then return to 1 only on a new rising edge of signal HRQ (ie. after HRQ has gone back to 0 and then goes to 1 again). Similarly, one portion of circuit 21 produces a signal FRX in response to the request signal FRQ; when FRQ goes to 1, FRX goes to 1 and remains at 1 until an FR port access cycle has been started, returning to 0 shortly before the end of the port access cycle. Signal FRX can then return to 1 only on a new rising edge of signal FRQ (ie. after FRQ has gone back to 0 and then goes to 1 again).

Circuit 21 also produces a request pending signal FRRP, which is fed as a control signal to the HR device 10. The signal FRRP goes to 1 when an FR device access cycle is in progress and causes the next HR port access to be held off until the FR port access cycle has finished if a conflict would otherwise occur. The early warning signal ASL is fed to a second portion of the latch circuit 21, which produces the request pending signal FRRP.

Signals HRX and FRX are passed to a resolver circuit RES 22 which passes them on to the circuit 23 as signals HRY and FRY. This resolver circuit ensures that only one of the signals HRY and FRY appears at any given time, operating on a simple priority basis to prevent either of the signals HRX and FRX from passing through if the other is already at 1.

Signals HRY and FRY are passed to block 23, which is a state machine or sequence control circuit, which has two main functions. It toggles a timing signal DLY when a port access is initiated (for either device); and it controls the access of the devices 10 and 11 to the bus 18. This sequence control circuit is coupled to a timing circuit 24, which can conveniently be a tapped delay line (or a series of delay lines). This timing circuit provides the requisite timing pulses for the timing requirements of the devices, and feeds them back to the sequence control circuit 23. (In the present system, the timing signals are the same for both devices; in general, however, not all of the timing signals will be required for both devices). The timing signal DLY, which initiates the port timing cycles, is asynchronous, subject of course to the requirement that a new cycle cannot be initiated until the current cycle is completed.

The sequence control circuit is normally in an idle state; on triggering, by one of the signals HRY and FRY, it enters a sequence of states defining the appropriate port cycle, and at the end of the port cycle, it returns to the idle state. For each of the two types of port cycle, the sequence of port cycle states is predetermined, with its timing determined by the timing signals from the timebase circuit 24 as described above.

Figure 3:
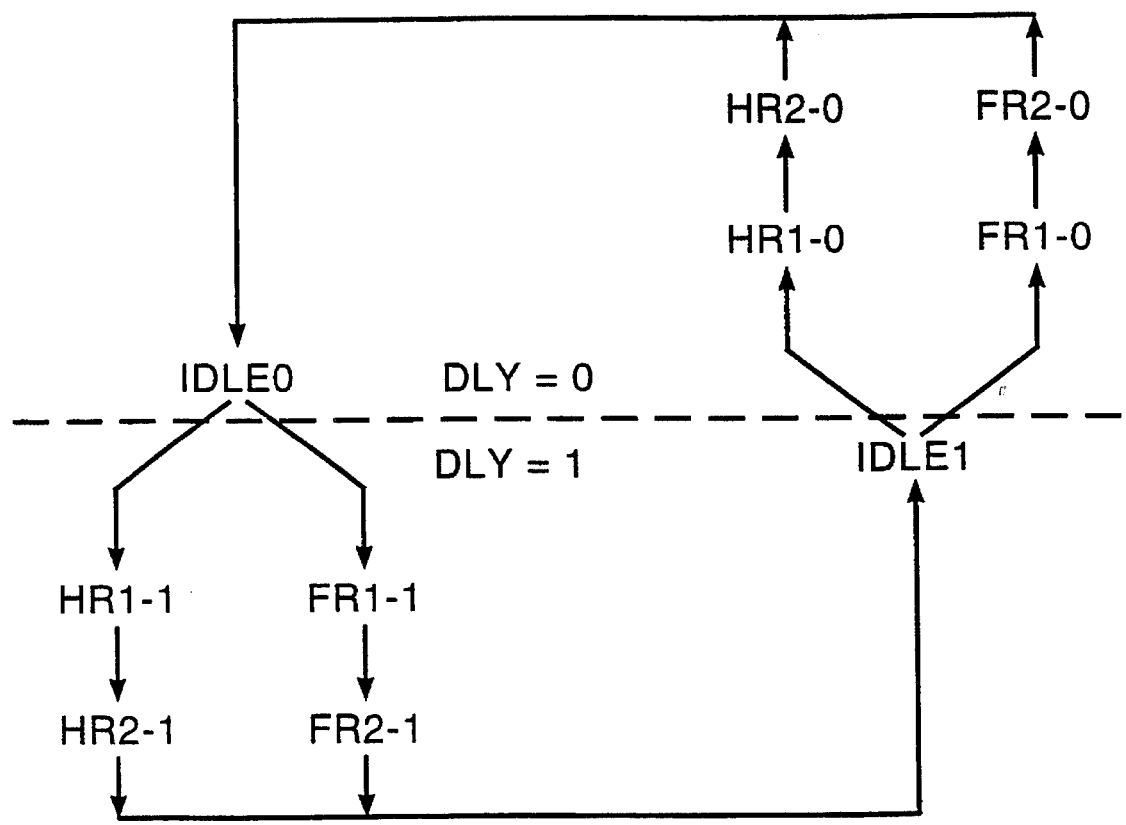
FIG. 3 is a state sequence diagram for the port controller.

FIG. 3 shows the state sequence, with the states of each of the two types of port cycle shown for convenience as two states HR1 and HR2 for an HR port cycle and corresponding states FR1 and FR2 for an FR port cycle. As will be seen below, the states for the two types of port cycle have the same timings; this is because both types of port cycle are concerned with accessing the same device (the memory on the common bus 18). In general, however, the two types of port cycle may be different, and either may include more than two states.

Inside the sequence control circuit 23, all states are effectively duplicated. This is because the timing of a port cycle is initiated by a simple change of state of the signal DLY, and this signal is not 'restored' at the end of a port cycle. Successive port cycles thus start with signal DLY in alternating states. As shown in FIG. 3, there are thus two IDLE states, IDLE0 and IDLE1, and the port access states are HR1-0, HR2-0, FR1-0 and FR2-0 for states with signal DLY at 0 following the IDLE1 state and HR1-1, HR2-1, FR1-1 and FR2-1 for states with signal DLY at 1 following the IDLE0 state. (Since the port access cycle states are the same for both types of cycle, HR and FR, the sequences can be abbreviated to 1-0, 2-0 and 1-1, 2-1.)

The state machine (not shown) can comprise a read-only memory. Each location of the memory corresponds to a different state, and each bit of the output of the selected location performs a different control function, either external (e.g. timing signals) or as address bits to determine the next state. The timing signals from the timebase generator are also used as address bits. The locations are duplicated in the same way as the states are duplicated, one or other of each pair of locations being selected in dependence on whether the timing signals (including the DLY signal) are rising or falling edges. The resolver 22 is necessary to prevent the state machine from entering undesired metastable states.

Other state machine implementations, such as crosscoupled logic, can also of course be used.

The two different states within port cycles are concerned with the timing of the operations of the memory 14 and the accompanying data and address transfers. Further, one event within the second state is utilised for resetting the latch circuits 20 and 21. As noted above each of these latch circuits responds to its input signal (HRQ or FRQ) by setting its output signal to 1 and holding it at 1 until shortly before the end of the access cycle. This reset is caused by a timing signal $T_s$, which is produced during the second state of the access cycle. The latch circuits 20 and 21 are therefore reset (ie. their outputs HRX and FRX reset to 0) at a point in the state HR2 or FR2 early enough to ensure that a second access cycle cannot be initiated by the previous request signal.

Figure 4:
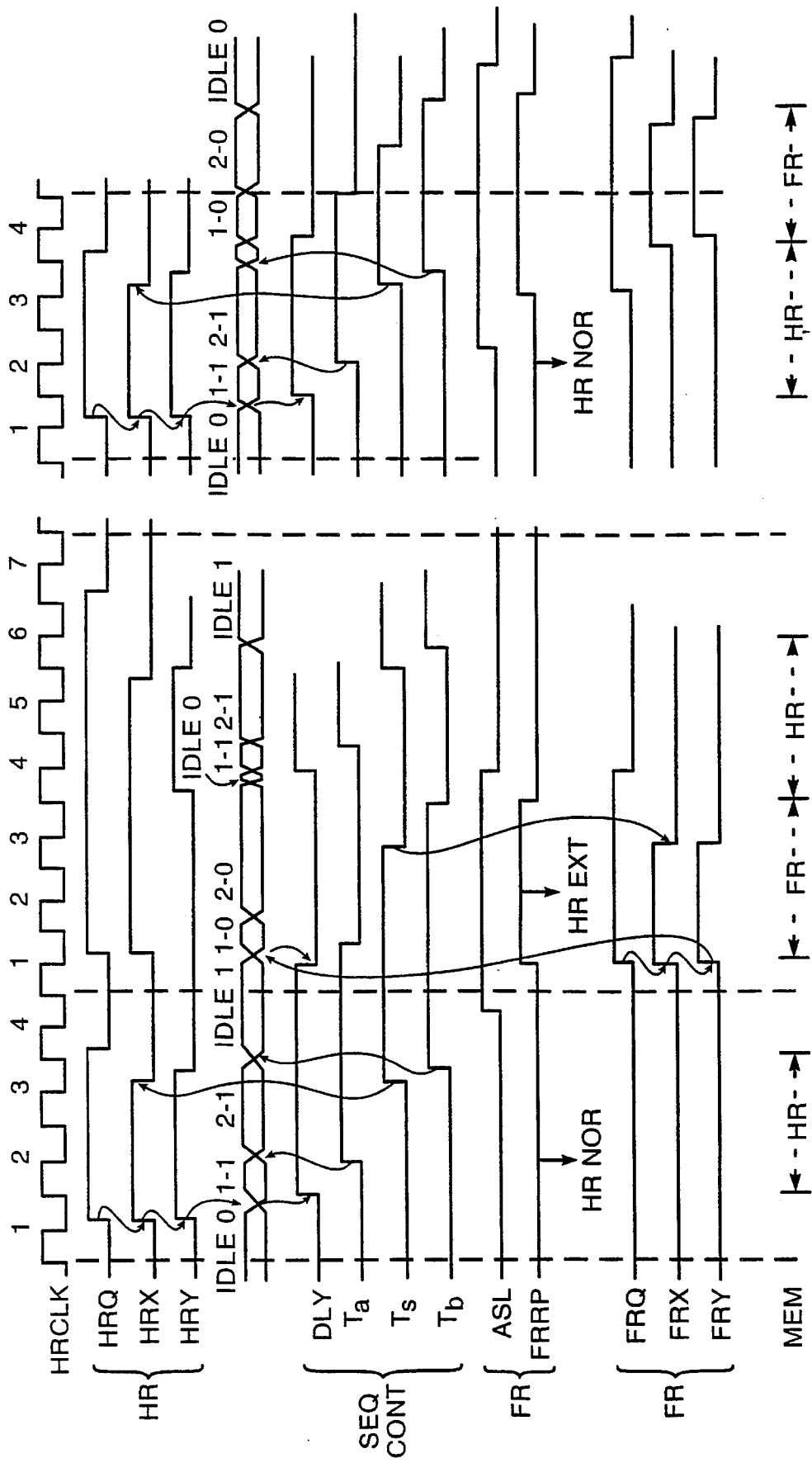
FIG. 4 is a timing diagram of the port controller.

FIG. 4 is a timing diagram showing typical sequences of operations, involving a first HR port access with the FR device quiescent, a second HR port with an "interfering" FR port access, and a third HR port access with a "non-interfering" FR port access. These accesses are shown along the bottom of the diagram. The second and third HR cycles with port accesses are actually separated by a considerable period of time (and further HR cycles with port accesses) not shown. The HR device 10 runs on a clock signal HRCLK; its normal cycle length is 4 clock periods.

The first HR cycle with a port access is initiated by signal HRQ going to 1 at the end of the first clock of its normal cycle. This causes signals HRX and, shortly after, HRY to go to 1. HRY going to 1 causes the sequence control circuit to pass from the idle state IDLE0 to the first state of the HR access cycle, HRI-1. The entry into the state HR1 causes the signal DLY to change state.

This change of state is fed to the timing circuit 24 which has a set of outputs $T_a$, $T_s$ and $T_b$. The signal changes appearing successively on this set of outputs from the timing circuit 24 will, in combination with the signal FRY or HRY, cause the sequence control circuit to step through the appropriate sequence of states back to the IDLE state.

The signal $T_s$, which resets the latches 20 and 21, is here treated as a subordinate signal inside state FR2 or HR2. It could equally be regarded as causing a change of state, with states FR2 and HR2 being divided into a pair of states, say FR2' and FR2" or HR2' and HR2" respectively. However, feeding it directly to the latches 20 and 21 reduces the number of distinct states and hence the complexity of the sequence control circuit.

The second HR cycle with a port access is initiated by signal HRQ going to 1 as before. In this cycle, the signals DLY and TA, $T_S$, and $T_B$ change state from 1 to 0 instead of from 0 to 1. Further, in this cycle an FR port access is also initiated by signal FRQ going to 1. This is similar to the initiation of an HR cycle with a port access, except that it is initiated through signals FRX and FRY instead of HRX and HRY.

The FR port request signal FRQ is preceded by an early warning signal ASL from the FR device. This signal ASL sets the corresponding half of the latch 21, which produces the FR request pending signal FRRP and passes it to the HR device.

The second HR cycle with a port access is initiated by signal HRQ going to 1 again, at the end of the first clock period of its normal cycle. At the end of the next clock period, the HR device 10 checks the state of the FRRP signal and, if this signal is set, it inserts three inactive clock periods into its normal cycle (under the control of its state machine, not shown), extending that cycle to 7 clock periods. This is indicated in FIG. 4 by HR NOR for a normal HR device cycle for the first cycle and HR EXT for an extended HR device cycle for the second cycle. The request pending signal delays the start of the next port access so that the HR access to the memory 14 will not occur until after the FR port access has finished. This results in the HR port access being delayed as shown in FIG. 4, until the FR port access has finished.

The third HR port cycle with a port access is, as usual, initiated by signal HRQ going to 1. Signals HRX and HRY are then produced, initiating the HR access. The FR early warning signal ASL appears, but after the end of the second clock period of the HR device cycle. Hence the HR device sees FRRP inactive at this point, and therefore continues with its normal cycle. The pending FR access is postponed until the HR access has finished and the state machine has returned to the idle state. The FR memory access can then start immediately as shown by the signals FRX and FRY.

On the next HR device cycle (not shown), the signal FRRP should be low when the HR device inspects it, so that next HR cycle can also proceed as a normal cycle, accessing the memory if necessary.

The HR device memory accesses are effectively synchronised with the HR device, simply because the HR device effectively drives those accesses. The FR memory accesses are asynchronous, but those which are delayed because of uncompleted HR device accesses are effectively forced into synchronism with the HR device.

The use of the ASL advance warning signal by the HR device is advantageous but not essential. The HR device could monitor some other signal indicative that an FR device access is pending or in progress provided that the timing allows the HR device to insert additional clock periods in its cycle before its own access is initiated.

It will be clear that further channels analogous to signal channels HRQ-HRX-HRY and FRQ-FRX-FRY can be provided producing request pending signals as appropriate which are fed to whichever other channels require request pending signals to inhibit the operation of the devices coupled to those channels.

We claim:

1. A controller for coupling a plurality of devices to a common bus, the bus and each device having a data channel, an address channel and a control channel, the controller having a data and address multiplexer for multiplexing the data and address channels of the devices onto the bus data and address channels and a control unit responsive to the control channels to control the multiplexer, wherein the control unit comprises:

resolver means responsive to an access request from any of the devices, to resolve competing access requests from different devices by passing on only one access request; and asynchronous sequence control means fed from the resolver means and coupled to an asynchronous timebase generator, both said sequence control means and said timebase generator being normally in an idle state, said sequence control means being responsive to said one access request passed on by said resolver means to initiate operation of said timebase generator and, in response to timing signals from said timebase generator, cycling through a series of states which control the multiplexer and provide timing signals to the bus.

2. A controller according to claim 1, further comprising a plurality of latch circuits one for each device for latching access requests from the devices, said latch circuits passing said access requests from the devices to said resolver means.

3. A controller according to claim 2, wherein at least one of said latch circuits, on being set with an access request from a first of the devices, sends a request pending signal to at least one other of the devices to cause said other device to extend its operating cycle and thereby ensure that any access request will be dealt with correctly.

4. A controller according to claim 3, wherein said latch circuit sending said request pending signal includes a portion responsive to an early warning signal from said first of the devices.

5. A controller according to claims 1, 2, 3, or 4, wherein said timebase generator comprises a delay line.

6. A controller according to claim 5, wherein the operation of said timebase generator is initiated by a change of signal level in either direction, and said sequence control means is responsive to timing signals each consisting of a change of level in either direction.

7. A controller according to claims 1, 2, 3, or 4, wherein the operation of said timebase generator is initiated by a change of signal level in either direction, and said sequence control means is responsive to timing signals each consisting of a change of level in either direction.

8. A controller according to either of claims 3 or 4, wherein said first of the devices associated with said latch circuit sending said request pending signal requires a minimum latency time (wait time) for access to the bus and said other device receiving said request pending signal requires a high average access rate to the bus.

9. A controller according to claim 8, wherein said timebase generator comprises a delay line.

10. A controller according to claim 9, wherein the operation of said timebase generator is initiated by a change of signal level in either direction, and said sequence control means is responsive to timing signals each consisting of a change of level in either direction.

11. A controller according to claim 8, wherein the operation of said timebase generator is initiated by a change of signal level in either direction, and said sequence control means is responsive to timing signals each consisting of a change of level in either direction.

\* \* \* \* \*